(12) United States Patent
Miyasaka et al.

(10) Patent No.: US 10,599,244 B2
(45) Date of Patent: Mar. 24, 2020

(54) DISPLAY DEVICE AND SENSOR DEVICE

(71) Applicant: Japan Display Inc., Tokyo (JP)

(72) Inventors: Koichi Miyasaka, Tokyo (JP);
Yoshikatsu Imazeki, Tokyo (JP);
Yoichi Kamijo, Tokyo (JP); Shuichi Osawa, Tokyo (JP); Yoshihiro Watanabe, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/214,644

(22) Filed: Dec. 10, 2018

(65) Prior Publication Data

US 2019/0179465 A1 Jun. 13, 2019

(30) Foreign Application Priority Data

Dec. 12, 2017 (JP) .................... 2017-237739

(51) Int. Cl.
*G06F 3/041* (2006.01)
*G06F 3/044* (2006.01)
*G02F 1/1333* (2006.01)
*G02F 1/1345* (2006.01)

(52) U.S. Cl.
CPC ........ *G06F 3/0412* (2013.01); *G02F 1/13338* (2013.01); *G02F 1/13452* (2013.01); *G02F 1/133308* (2013.01); *G06F 3/044* (2013.01); *G06F 3/0445* (2019.05); *G06F 3/0446* (2019.05); *G06F 3/0448* (2019.05); *G06F 3/04164* (2019.05)

(58) Field of Classification Search
CPC ........... G02F 1/133308; G02F 1/13338; G02F 1/13452; G02F 1/133528; G02F 1/1345; G06F 3/0412; G06F 3/04164; G06F 3/044; G06F 3/0445; G06F 3/0446; G06F 3/0448; H01L 27/1248; H01L 27/3276; H01L 51/0097; H01L 21/31144; H01L 23/49827; H01L 27/323; H05K 1/113
See application file for complete search history.

(56) References Cited

U.S. PATENT DOCUMENTS

2001/0012684 A1* 8/2001 Hattori ............. H01L 21/31144
438/618
2008/0225216 A1* 9/2008 Shimodaira ........... G02F 1/1345
349/143
2011/0316810 A1* 12/2011 Tsujino ............... G02F 1/13338
345/174

(Continued)

FOREIGN PATENT DOCUMENTS

JP 2002-040465 A 2/2002

*Primary Examiner* — Richard J Hong
(74) *Attorney, Agent, or Firm* — K&L Gates LLP

(57) ABSTRACT

According to one embodiment, a display device includes a display panel including a display area and a non-display area including a first area and a second area. The display panel includes a first substrate, a second substrate including a contact hole crossing a borderline, a protection layer provided over the display area and the first area, and a connecting material. An outer edge of the protection layer includes one first outer edge located on the borderline, another first outer edge located on the borderline opposed to the one first outer edge across the contact hole, and a second outer edge provided in the first area, connected to an end of the one first outer edge and extending along the contact hole.

20 Claims, 13 Drawing Sheets

(56) References Cited

U.S. PATENT DOCUMENTS

| | | | |
|---|---|---|---|
| 2012/0261179 A1* | 10/2012 | Yamamoto | H01L 23/49827 |
| | | | 174/264 |
| 2013/0240855 A1* | 9/2013 | Chida | H01L 27/3276 |
| | | | 257/40 |
| 2014/0091390 A1* | 4/2014 | Hung | H01L 27/1248 |
| | | | 257/347 |
| 2015/0263314 A1* | 9/2015 | Sakuishi | H01L 51/0097 |
| | | | 438/28 |
| 2018/0069054 A1* | 3/2018 | Zhai | H01L 27/323 |
| 2018/0074357 A1* | 3/2018 | Chen | G02F 1/13338 |
| 2018/0110122 A1* | 4/2018 | Lee | H05K 1/113 |
| 2019/0369436 A1* | 12/2019 | Ohashi | G02F 1/133528 |

\* cited by examiner

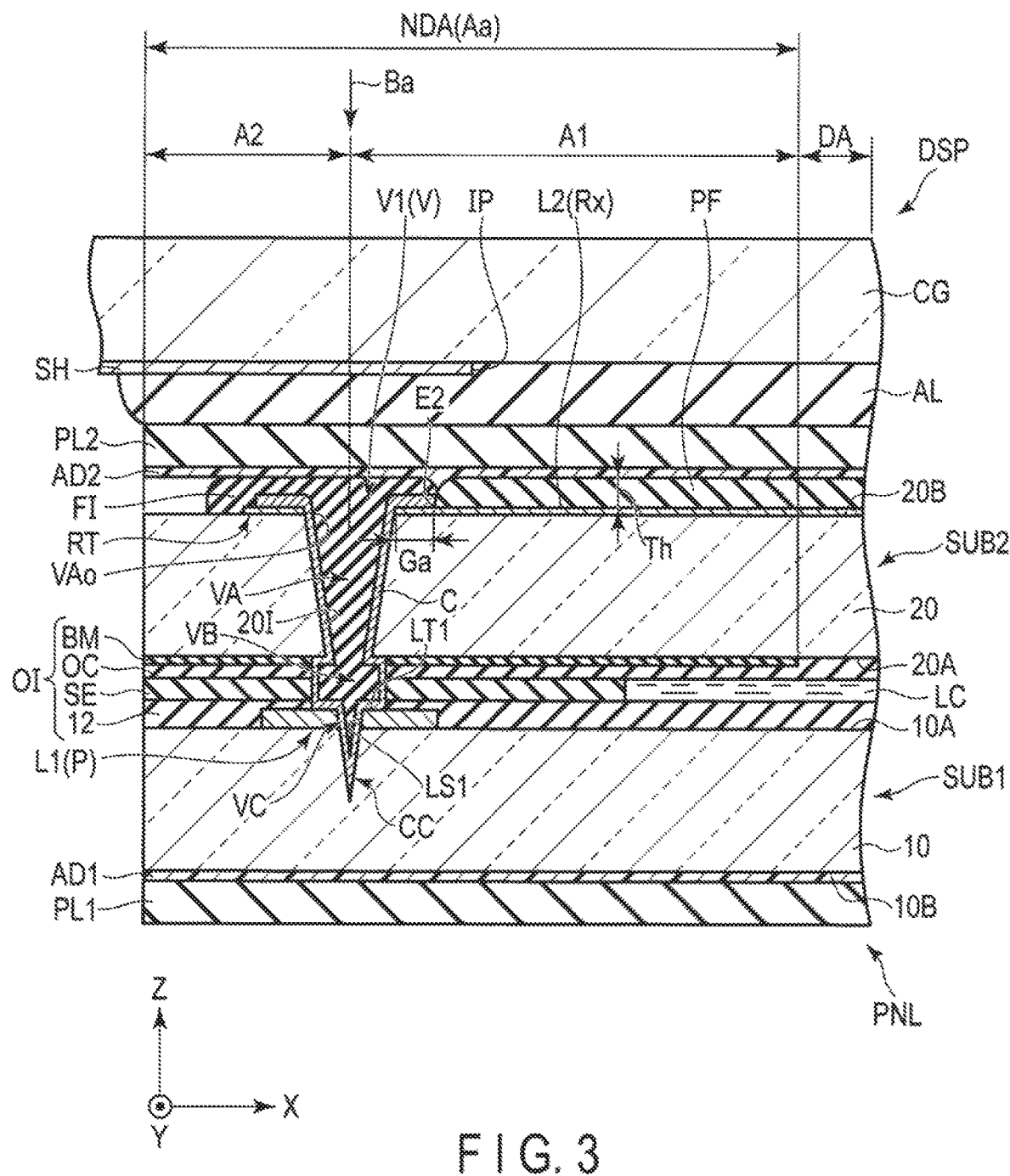
F I G. 3

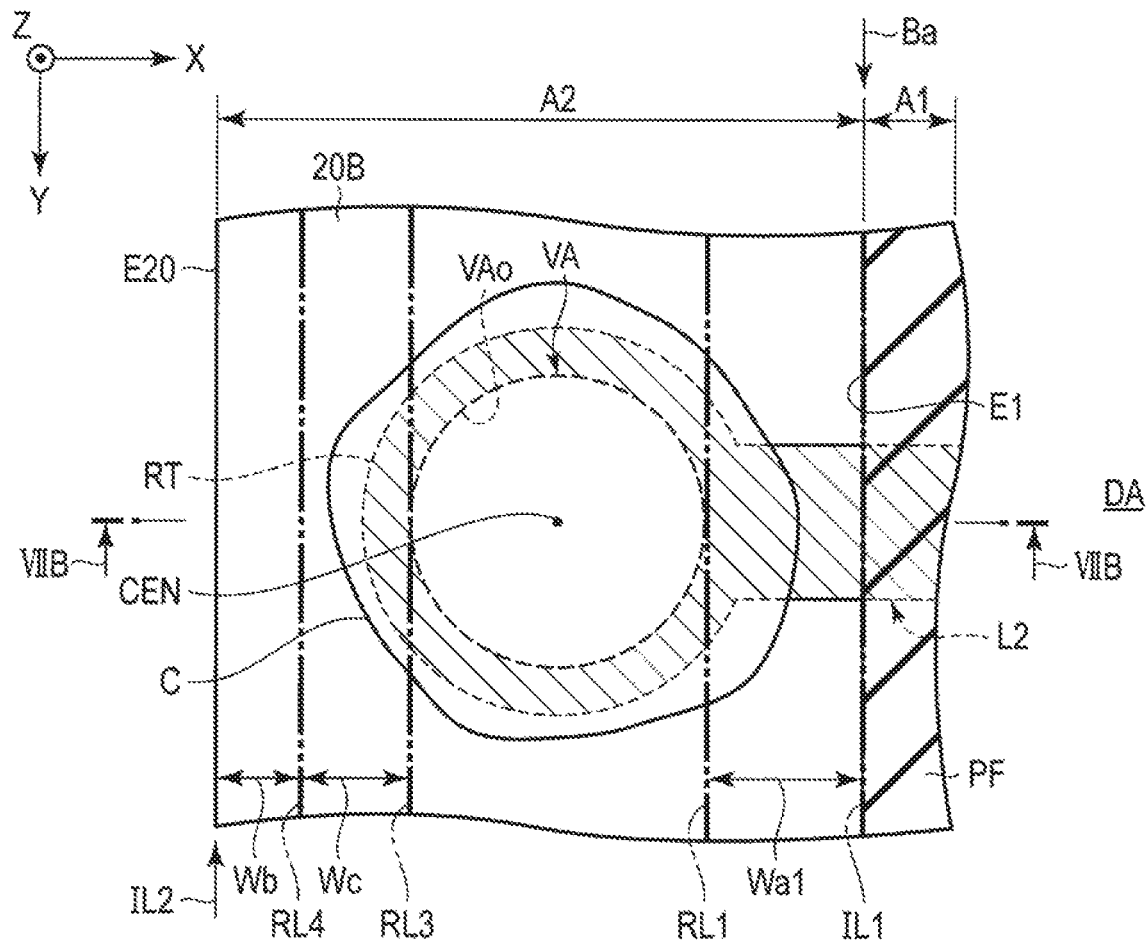
F I G. 7A

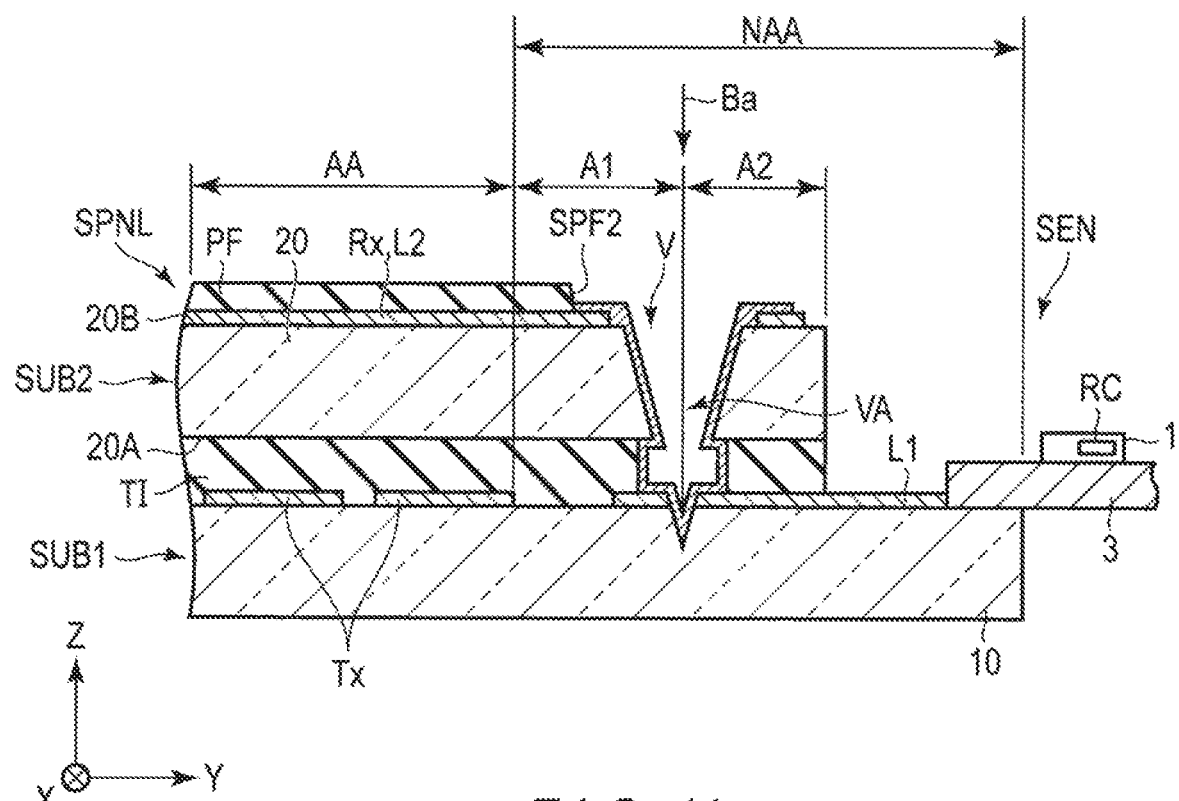
F I G. 11

DISPLAY DEVICE AND SENSOR DEVICE

CROSS-REFERENCE TO RELATED APPLICATIONS

This application is based upon and claims the benefit of priority from Japanese Patent Application No. 2017-237739, filed Dec. 12, 2017, the entire contents of which are incorporated herein by reference.

FIELD

Embodiments described herein relate generally to a display device and a sensor device.

BACKGROUND

Recently, various techniques for narrowing the frame of a display device have been considered. For example, a technique for electrically connecting a wiring line which comprises an in-hole connector in a hole penetrating the inner surface and outer surface of a first substrate formed of resin and a wiring line which is provided on the inner surface of a second substrate formed of resin by an inter-substrate connector has been disclosed.

BRIEF DESCRIPTION OF THE DRAWINGS

FIG. 3 is a sectional view of the display device taken along line III-III of FIG. 1.

FIG. 7A is a plan view showing a non-display area of a display device according to a comparative example 1, and shows a second basement, a second conductive layer, a protection layer and a connecting material.

FIG. 11 is a sectional view showing a configuration example of a sensor device according to a second embodiment.

SUMMARY

Figure 1:
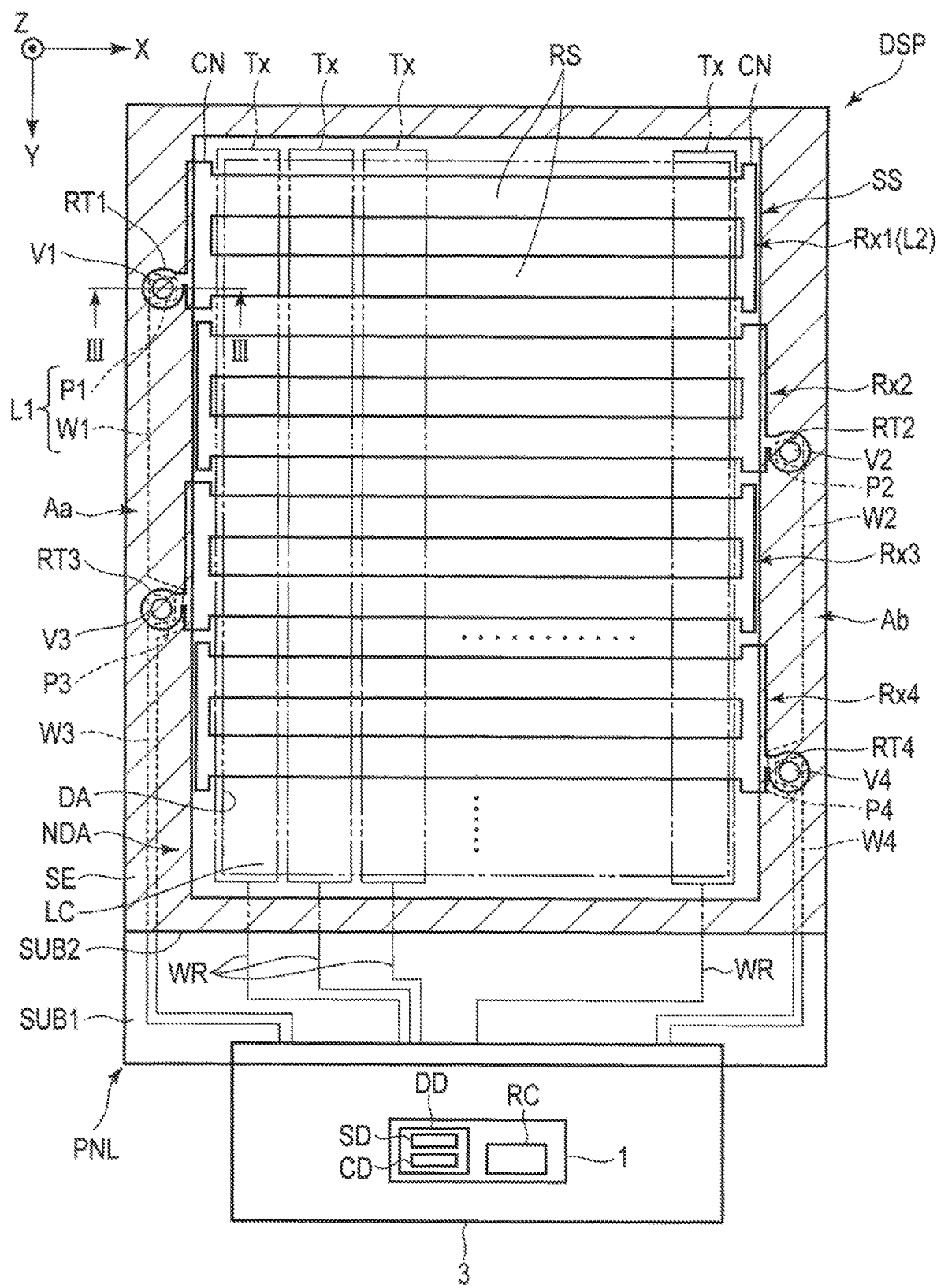
FIG. 1 is a plan view showing a configuration example of a display device according to a first embodiment.

The present application relates generally to a display device and a sensor device.

According to one embodiment, a display device includes a display panel including a display area and a non-display area including a first area and a second area. The display panel includes a first substrate, a second substrate including a contact hole crossing a borderline, a protection layer provided over the display area and the first area, and a connecting material. An outer edge of the protection layer includes one first outer edge located on the borderline, another first outer edge located on the borderline opposed to the one first outer edge across the contact hole, and a second outer edge provided in the first area, connected to an end of the one first outer edge and extending along the contact hole.

DETAILED DESCRIPTION

In general, according to one embodiment, there is provided a display device comprising a display panel including a display area and a non-display area, the non-display area including a first area provided along an outer edge of the display area and a second area provided along an outer edge of the first area, the display panel comprising: a first substrate comprising a first basement and a first conductive layer; a second substrate comprising a second basement including a first surface separately opposed to the first conductive layer, a second surface opposed to the first surface and a contact hole penetrating from the second surface to the first surface and crossing a borderline between the first area and the second area; and a second conductive layer provided on the second surface; a protection layer provided over the display area and the first area of the second surface and covering at least a portion which belongs to the display area of the second conductive layer; and a connecting material electrically connecting the first conductive layer to the second conductive layer through the contact hole, wherein an outer edge of the protection layer includes one first outer edge located on the borderline, another first outer edge located on the borderline opposed to the one first outer edge across the contact hole, and a second outer edge provided in the first area, connected to an end of the one first outer edge and an end of the other first outer edge and extending along the contact hole.

According to another embodiment, there is provided a sensor device comprising a sensor panel including a sensing area and a non-sensing area, the non-sensing area including a first area provided along an outer edge of the sensing area and a second area provided along an outer edge of the first area, the sensor panel comprising: a first substrate comprising a first basement and a first conductive layer; a second substrate comprising a second basement including a first surface separately opposed to the first conductive layer, a second surface opposed to the first surface and a contact hole penetrating from the second surface to the first surface and crossing a borderline between the first area and the second area; and a second conductive layer provided on the second surface; a protection layer provided over the sensing area and the first area of the second surface and covering at least a portion which belongs to the sensing area of the second conductive layer; and a connecting material electrically connecting the first conductive layer to the second conductive layer through the contact hole, wherein an outer edge of the protection layer includes one first outer edge located on the borderline, another first outer edge located on the borderline opposed to the one first outer edge across the contact hole, and a second outer edge provided in the first area, connected to an end of the one first outer edge and an end of the other first outer edge and extending along the contact hole.

Embodiments, modified examples and comparative examples will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

In the embodiments disclosed here, the display device can be used in various devices such as smartphones, tablet computers, mobile phones, notebook computers and game consoles. The main structures disclosed in the embodiments are applicable to liquid crystal display devices, self-luminous display devices such as organic electroluminescent display devices, electronic paper type display devices comprising electrophoresis elements, etc., display devices adopting micro-electromechanical systems (MEMS), and display devices adopting electrochromism.

Each of the embodiments described below is applicable to various display devices having an inter-substrate conducting structure in which a first basement and a second basement are disposed so as to be spaced apart from each other, the second basement has a hole, and a first conductive layer located in the first basement and a second conductive layer located in the second basement are electrically connected to each other via the hole.

First Embodiment

Firstly, a first embodiment will be described. FIG. 1 is a plan view showing an example of a display device DSP according to the first embodiment. While a first direction X, a second direction Y and a third direction Z are orthogonal to each other, these directions may cross each other at an angle other than 90°. The first direction X and the second direction Y correspond to directions parallel to the surfaces of substrates constituting the display device DSP, and the third direction Z corresponds to the thickness direction of the display device DSP. Here, a liquid crystal display device equipped with a sensor SS will be described as an example of the display device DSP.

As shown in FIG. 1, the display device DSP comprises a display panel PNL, an IC chip 1, a circuit board (a wiring substrate) 3, a backlight unit BL which will be described later, and the like. The display panel PNL is a liquid crystal display panel and comprises a first substrate SUB1, a second substrate SUB2, a sealing member SE and a liquid crystal layer LC as a display function layer. The second substrate SUB2 is opposed to the first substrate SUB1 in the third direction Z. The sealing member SE corresponds to a portion indicated by rising diagonal lines in FIG. 1 and bonds the first substrate SUB1 and the second substrate SUB2 together. The liquid crystal layer LC is located in a space between the first substrate SUB1 and the second substrate SUB2 on the inside of the sealing member SE.

In the following description, a direction from the first substrate SUB1 toward the second substrate SUB2 is referred to as upward, and a direction from the second substrate SUB2 toward the first substrate SUB1 is referred to as downward. Further, a view from the second substrate SUB2 toward the first substrate SUB1 is referred to as a plan view.

The display panel PNL comprises a display area DA in which an image is displayed and a non-display area NDA which is located on the outside of the display area DA. The display area DA is surrounded by and located inside the sealing member SE. The non-display area NDA is a frame-shaped area surrounding the display area DA, is provided along the outer edges of the display area DA, and is adjacent to the display area DA. The sealing member SE is located in the non-display area NDA.

The non-display area NDA includes a strip-shaped first connecting area Aa which is located on the left side of the display area DA and extends in the second direction Y, and a strip-shaped second connecting area Ab which is located on the right side of the display area DA and extends in the second direction Y.

The IC chip 1 functions as a controller of the display panel PNL, the sensor SS and the like. The IC chip 1 is mounted on the circuit board 3. The IC chip 1 is not limited to the example shown in FIG. 1 but may be mounted on a portion of the first substrate SUB1 which extends on the outside of the second substrate SUB2 or may be mounted on an external circuit board which is connected to the circuit board 3. For example, a display driver DD which outputs a signal necessary for displaying an image is incorporated into the IC chip 1. The display driver DD includes at least part of a signal line drive circuit SD for driving signal lines which will be described later, a scanning line drive circuit for driving scanning lines, and a common electrode drive circuit CD for driving common electrodes which will be described later. For example, the display driver DD includes the signal line drive circuit SD and the common electrode drive circuit CD. Further, in the example shown in FIG. 1, a detection circuit RC which functions as a touch panel controller or the like is incorporated into the IC chip 1. The detection circuit RC may be incorporated into an IC chip other than the IC chip 1.

For example, the display panel PNL may be a transmissive display panel having a transmissive display function of displaying an image by selectively transmitting light from below the first substrate SUB1 or may be a reflective display panel having a reflective display function of displaying an image by selectively reflecting light from above the second substrate SUB2. Alternatively, the display panel PNL may be a transreflective display panel having the transmissive display function and the reflective display function.

The sensor SS performs sensing for detecting the contact or approach of an object with or to the display device DSP. The sensor SS is a capacitive sensor of a mutual capacitance mode and detects the contact or approach of an object based on a change in electrostatic capacitance between a pair of electrodes opposed to each other via a dielectric. The sensor SS comprises a plurality of sensor drive electrodes Tx and a plurality of detection electrodes Rx (Rx1, Rx2, Rx3, Rx4 . . . ).

Each of the detection electrodes Rx comprises body portions RS which cross the display area and connecting portions CN which connect the body portions RS. Further, the detection electrodes Rx comprise terminal portions RT (RT1, RT2, RT3, RT4 . . . ) connected to the connecting portions CN, respectively.

The body portions RS have the shape of a strip formed of a collective entity of meshed fine metal wires. Further, a dummy area in which metal wires are arranged substantially in the same manner as those of the body portions RS exists between the body portions RS which are adjacent to each other. The metal wires of the dummy area are not connected to any wiring line and are in an electrically floating state.

Further, at least a part of each of the terminal portions RT is located so as to overlap the sealing member SE in a plan view. Each of the terminal portions RT is located in the first connecting area Aa or the second connecting area Ab of the non-display area NDA.

The first substrate SUB1 comprises pads P (P1, P2, P3, P4 . . . ) and wiring lines W (W1, W2, W3, W4 . . . ). The pads P and the wiring lines W are located in the first connecting area Aa and the second connecting area Ab of the non-display area NDA and overlap the sealing member SE in a plan view. The pads P are located so as to overlap the terminal portions RT, respectively, in a plan view. The wiring lines W are connected to the pads P, extend in the second direction Y and the first direction X, and are electrically connected to the detection circuit RC of the IC chip 1 via the circuit board 3, respectively.

Contact holes V (V1, V2, V3, V4 . . . ) are formed at positions at which the terminal portions RT and the pads P are opposed to each other, respectively. The contact holes will be described later.

The sensor drive electrodes Tx are provided in the first substrate SUB1. The detection electrodes Rx are provided in the second substrate SUB2. The sensor drive electrodes Tx and the detection electrodes Rx cross each other in the X-Y plane. For example, the sensor drive electrodes Tx have the shape of a strip extending in the second direction Y and are arranged so as to be spaced apart from each other in the first direction X.

The sensor drive electrodes Tx are electrically connected to the common electrode drive circuit CD via the wiring lines WR, respectively. In the present embodiment, the sensor drive electrodes Tx are formed of common electrodes CE which will be described later. Each of the sensor drive electrodes Tx has the function of producing an electric field between the pixel electrode PE and itself and the function of detecting the position of an object by producing a capacitance between the detection electrode Rx and itself.

The common electrode drive circuit CD supplies a common signal to the sensor drive electrodes Tx including the common electrodes CE in a display period in which an image is displayed in the display area DA. In the display period, the signal line drive circuit SD supplies an image signal to pixel electrodes PE which will be described later. Further, the common electrode drive circuit CD supplies a sensor drive signal to the sensor drive electrodes Tx in a sensing period (touch period) in which sensing is performed. As the sensor drive signal is supplied to each of the sensor drive electrodes Tx, each of the detection electrodes Rx outputs a sensor signal necessary for sensing, that is, a signal based on a change in capacitance between the sensor drive electrode Tx and the detection electrode Rx. The detection circuit RC shown in FIG. 1 reads the sensor signals which are output from the detection electrodes Rx.

The sensor SS is not limited to a sensor of a mutual capacitance mode which detects an object based on a change in electrostatic capacitance between the sensor drive electrode Tx and the detection electrode Rx but may be a sensor of a self capacitance mode which detects an object based on a change in capacitance of the detection electrode Rx itself.

Figure 2:
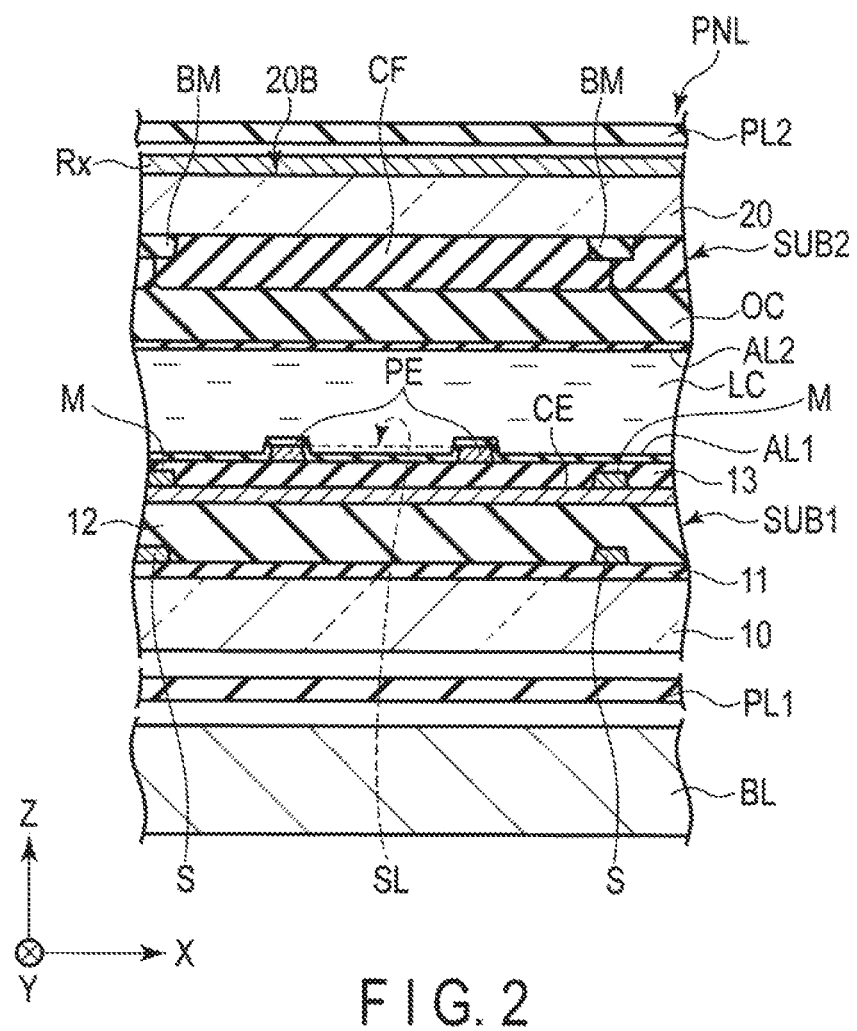
FIG. 2 is a sectional view showing a display area of a display panel shown in FIG. 1.

FIG. 2 is a sectional view of the display device DSP taken in the first direction X in the display area DA. In the example shown in FIG. 2, the display panel PNL has a structure conforming to a display mode which mainly uses a lateral electric field substantially parallel to the X-Y plane. The display panel PNL may have a structure conforming to a display mode which uses a longitudinal electric field perpendicular to the X-Y plane, an electric field inclined with respect to the X-Y plane or a combination of these electric fields.

As shown in FIG. 2, the first substrate SUB1 comprises the first basement 10, and on the upper surface (third surface) of the first basement 10, a first insulating layer 11, signal lines S, a second insulating layer 12, the common electrode CE, metal layers M, a third insulating layer 13, the pixel electrode PE, a first alignment film AL1 and the like are stacked in this order. For example, the metal layers M are formed by stacking molybdenum, aluminum and molybdenum in this order. In FIG. 2, switching elements, scanning lines, various insulating layers interposed therebetween and the like are omitted.

The second substrate SUB2 comprises the second basement 20, light-shielding layers BM, color filters CF, an overcoat layer OC, a second alignment film AL2 and the like. The light-shielding layers BM, the color filters CF, the overcoat layer OC and the second alignment film AL2 are stacked in this order on the lower surface (first surface) of the second basement 20.

A first polarizer PL1 is located between the first basement 10 and the backlight unit BL. A second polarizer PL2 is located above the detection electrode Rx provided on the second basement 20.

Next, the previously-described contact holes V (V1, V2, V3, V4 . . . ) will be described. FIG. 3 is a sectional view of the display device DSP taken along line III-III of FIG. 1. Here, the structure of the first connecting area Aa will be described as a representative of the first connecting area Aa and the second connecting area Ab.

As shown in FIG. 3, the first connecting area Aa of the non-display area NDA includes a first area A1 provided along an outer edge of the display area DA, and a second area A2 provided along an outer edge of the first area A1. The first area A1 is located between the display area DA and the second area A2.

The display device DSP comprises the first substrate SUB1, the second substrate SUB2, an organic insulating layer OI, a protection layer PF, a connecting material C, a filling material FI, the first polarizer PL1, the second polarizer PL2 and a cover member CG The first polarizer PL1 is bonded to the first substrate SUB1 by an adhesive layer AD1. The second polarizer PL2 is bonded to the second substrate SUB2 by an adhesive layer AD2.

The first substrate SUB1 comprises the previously-described first basement 10 and a first conductive layer L1. The first basement 10 includes a third surface 10A which is opposed to the second substrate SUB2, and a fourth surface 10B which is opposite to the third surface 10A. The first conductive layer L1 includes the previously-described pads P (P1, P2, P3, P4 . . . ) and the wiring lines W (W1, W2, W3, W4 . . . ) and is located on the third surface 10A side of the first basement 10. The first insulating layer 11 shown in FIG. 2 and other insulating layer and other conductive layer may be disposed between the first basement 10 and the pads P and between the first basement 10 and the second insulating layer 12.

The second substrate SUB2 comprises the previously-described second basement 20 and a second conductive layer L2. The second basement 20 includes a first surface 20A which is opposed to the first conductive layer L1 and is separated from the first conductive layer L1 in the third direction Z, and a second surface 20B which is opposite to the first surface 20A. The second conductive layer L2 includes the previously-described detection electrodes Rx, that is, the terminal portions RT (RT1, RT2, RT3, RT4 . . . ), the connecting portions CN and the body portions RS. The second conductive layer L2 is located on the second surface 20B side.

The protection layer PF is provided over the display area DA and the non-display area NDA. In the first connecting area Aa, the protection layer PF is provided over the first area A1 of the second surface 20B and is not located in the second area A2. The protection layer PF has a first outer edge (E1) which will be described later and a second outer edge E2. The protection layer PF covers at least a portion which belongs to the display area DA of the second conductive layer L2. In other words, the first basement 10, the first conductive layer L1, the second basement 20, the second conductive layer L2 and the protection layer PF are arranged in this order in the third direction Z.

Here, the relationship of a borderline Ba between the first area A1 and the second area A2 to the first outer edge (E1) of the protection layer PF will be described. Although the first outer edge (E1) of the protection layer PF is provided discontinuously in the second direction Y due to the presence of the second outer edge E2 which will be described later, the borderline Ba represents a virtual line formed of the continuous first outer edge (E1).

The organic insulating layer OI is located between the first conductive layer L1 and the second basement 20. In place of the organic insulating layer OI, an inorganic insulating layer or other conductive layer may be located or an air layer may be located. Various insulating layers and various conductive layers may be disposed between the second basement 20 and the second conductive layer L2 or on the second conductive layer L2.

For example, the organic insulating layer OI includes the sealing member SE which bonds the first substrate SUB1 and the second substrate SUB2 together, the second insulating layer 12 of the first substrate SUB1, the light-shielding layer BM and the overcoat layer OC of the second substrate SUB2 and the like. The sealing member SE is located between the second insulating layer 12 and the overcoat layer OC. The liquid crystal layer LC is provided in a gap between the first substrate SUB1 and the second substrate SUB2 and is surrounded by the sealing member SE.

The metal layers M, the third insulating layer 13 and the first alignment film AL1 which are shown in FIG. 2 may be interposed between the second insulating layer 12 and the sealing member SE. The second alignment film AL2 shown in FIG. 2 may be interposed between the overcoat layer OC and the sealing member SE.

The first and second basements 10 and 20 are formed of an insulating material such as glass or resin. The protection layer PF is formed of, for example, an organic insulating material such as acrylic resin. The first and second conductive layers L1 and L2 are formed of, for example, a metal material such as molybdenum, tungsten, titanium, aluminum, silver, copper or chromium, an alloy containing these metal materials, a transparent conductive material such as indium tin oxide (ITO) or indium zinc oxide (IZO), or the like. The first and second conductive layers L1 and L2 may have a single-layer structure or may have a multilayer structure. In the present embodiment, the first conductive layer L1 is formed by stacking titanium, aluminum and titanium in this order, and the second conductive layer L2 is formed by stacking molybdenum, aluminum, molybdenum and the transparent conductive material in this order.

A first hole VA is formed in the second substrate SUB2. The first hole VA is provided at a position crossing the borderline Ba in the non-display area NDA and penetrates from the first surface 20A to the second surface 20B. The first hole VA includes an opening VAo in the second surface 20B. The second outer edge E2 is provided at a predetermined distance from the opening VAo. The second conductive layer L2 is located around the opening VAo and does not exist at a position overlapping the first hole VA.

The display device DSP further comprises a second hole VB which penetrates the layers of the organic insulating layer OI, a third hole VC which penetrates the first conductive layer L1 and a concavity CC which is formed in the first basement 10, in addition to the first hole VA. The first hole VA, the second hole VB, the third hole VC and the concavity CC communicate with each other and constitute the previously-described contact hole V.

The second hole VB includes a hole which penetrates the second insulating layer 12, a hole which penetrates the sealing member SE, a hole which penetrates the light-shielding layer BM and the overcoat layer OC, and the like. The first conductive layer L1 includes an upper surface LT1 which is not covered with the organic insulating layer OI in the second hole VB, and an inner surface LS1 in the third hole VC. The second hole VB, the third hole VC and the concavity CC are located directly below the first hole VA. This contact hole V can be formed by emitting a laser beam from above the second substrate SUB2.

Here, a distance Ga from the rim of the opening VAo to the second outer edge E2 should preferably be several micrometers to several tens of micrometers. The protection layer PF has a thickness Th in the third direction Z. This thickness should preferably be several micrometers to several tens of micrometers. Further, the distance Ga and the thickness Th should preferably have substantially equal length as each other. Here, substantially equal means that the distance Ga is greater than or equal to half the thickness Th and less than or equal to 1.5 times the thickness Th. In the present embodiment, the distance Ga and the thickness Th are 5 µm.

The connecting material C is disposed in the contact hole V. The connecting material C and the layers in which the contact hole V is formed, that is, the first substrate SUB1, the second substrate SUB2 and the organic insulating layer OI constitute the inter-substrate conducting structure according to the present embodiment. The connecting material C should preferably contain, for example, a metal material such as silver and contain a metal material in which particles of the metal material whose particle diameter is of the order of several nanometers to several tens of nanometers are mixed in a solvent.

Since the solvent evaporates in the course of the manufacturing process, the metal material may be attached to the wall surface of the contact hole or the circumference of the opening as the connecting material C.

The connecting material C electrically connects the first conductive layer L1 and the second conductive layer L2, which are provided respectively in different substrates, through the contact hole V. The connecting material C is located inside and outside the contact hole V in the non-display area NDA. The connecting material C is in contact with the second outer edge E2. The connecting material C covers an inner surface 201 of the second basement 20 in the first hole VA, the inner surface of the organic insulating layer OI in the second hole VB, the inner surface LS1 and the like. Further, the connecting material C is located above the second surface 20B.

In the example shown in FIG. 3, when focusing on the relationship between the connecting material C and the first conductive layer L1, the connecting material C is in contact with the upper surface LT1 and the inner surface LS1 of the pad P. When focusing on the relationship between the connecting material C and the second conductive layer L2, the connecting material C is in contact with a portion of the terminal portion RT which is not covered with the protection layer PF.

In the example shown in FIG. 3, the connecting material C is in contact with the inner surface 201, the inner surface of the second hole VB and the inner surface LS1, respectively, and the vicinities of centers thereof are not filled with the connecting material C. More specifically, the connecting material only covers these inner surfaces in the form of a film, and the film is thin.

To fill the hollow portion of the contact hole V, the contact hole V is covered with the filling material FI. For example, the contact hole V is filled with the filling material FI. Alternatively, a hollow may exist in the contact hole V. The filling material FI is formed of, for example, a material similar to that of the protection layer PF. Note that the contact hole V may be completely filled with the connecting material C instead.

The connecting material C is formed continuously between the first conductive layer L1 and the second conductive layer L2 without interruption. As a result, the second conductive layer L2 is electrically connected to the previously-described circuit board 3 via the connecting material C and the first conductive layer L1. Therefore, a control circuit which writes a signal to the second conductive layer L2 or reads a signal output from the second conductive layer L2 can be connected to the second conductive layer L2 via the circuit board 3. Consequently, it is no longer necessary to separately provide a circuit board for the second substrate SUB2 for connecting the second conductive layer L2 and the control circuit.

The cover member CG is flat, is formed over the display area DA and the non-display area NDA, and covers the whole surface of the display panel PNL. A light-shielding layer SH is formed on a surface of the cover member CG which is opposed to the display panel PNL. The light-shielding layer SH is provided in the non-display area NDA. The light-shielding layer SH covers the contact hole V, the connecting material C, and the like.

The cover member CG is bonded to the second polarizer PL2 by an adhesive layer AL. For example, the adhesive layer AL is formed of optically clear resin (OCR). The adhesive layer AL has a substantially uniform thickness over the whole area thereof.

Figure 4:
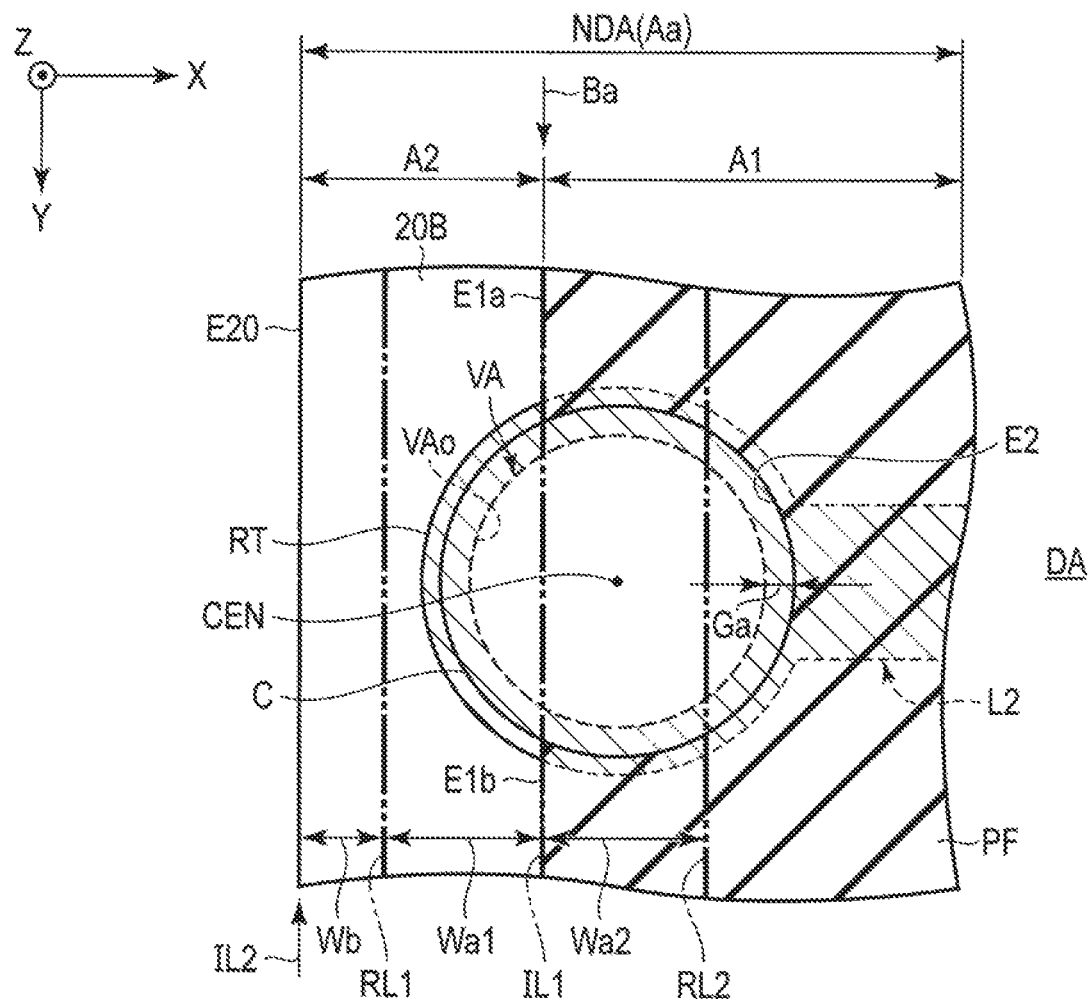
FIG. 4 is a plan view showing a non-display area of the display device shown in FIG. 3, and shows a second basement, a second conductive layer, a protection layer and a connecting material.

As shown in FIG. 4, the opening VAo of the first hole VA is provided so as to cross the borderline Ba. In the present embodiment, the opening VAo has the shape of a perfect circle in a plan view and has a center (central axis) CEN. The shape of the opening VAo may be a circle other than a perfect circle or may be a shape other than a circle. In this case, the center CEN is the geometric center of the opening VAo. The center CEN is located on the display area DA side of the borderline Ba. In other words, the center CEN is located on the first area A1. That is, the opening VAo is formed from the first area A1 to the second area A2, and the (opening) area of the first area A1 is larger than the (opening) area of the second area A2.

The terminal portion RT has the shape of a ring in a plan view and surrounds the opening VAo around the whole circumference thereof.

The outer edges of the protection layer PF include the first outer edges E1 and the second outer edges E2. In the present embodiment, the second outer edges E2 are in one-to-one correspondence with the first holes VA. The number of the second outer edges E2 is the same as the number of the first holes VA. Here, one first outer edge E1a, the other first outer edge E1b and the second outer edge E2 are illustrated.

The first outer edge E1a is located on the borderline Ba. An end of the first outer edge E1a and an end of the first outer edge E1b are spaced apart from each other and are opposed to each other across the first hole VA, and the first outer edge E1b is also located on the borderline Ba. The second outer edge E2 is provided in the first area A1. The second outer edge E2 is connected to the end of the first outer edge E1a and the end of the first outer edge E1b, and extends so as detour the first hole VA (opening VAo) at the first area A1. The second outer edge E2 extends along the first hole VA (the contact hole V). As will be described later, the first outer edge E1 is obtained through formation of the protection layer PF, and the second outer edge E2 is obtained through emission of a laser beam to the protection layer PF after the protection layer PF is formed.

In the present embodiment, the second outer edge E2 has the shape of an arc in a plan view. Further, the second outer edge E2 and a portion of the rim of the opening VAo located in the first area A1 should preferably be geometrically similar to each other in a plan view.

In the first area A1, the connecting material C is in contact with a portion of the terminal portion RT (second conductive layer L2) located in an area sandwiched between the rim of the opening VAo and the second outer edge E2. Further, the connecting material C is in contact with a portion of the terminal portion RT (second conductive layer L2) located in the second area A2.

Still further, the protection layer PF is formed by photolithography in the present embodiment. The borderline Ba is located on an ideal line IL1 which extends linearly in the second direction Y, and the position of the first outer edge E1 is an ideal position. By using photolithography as described above, the first outer edge E1 can be formed at a desired position.

Incidentally, the protection layer PF may be formed by a technique other than photolithography. For example, the protection layer PF can be formed by printing. However, in the case of using printing, the first outer edge E1 of the protection layer PF may be deviated outward or inward from the ideal line IL1.

Here, a first reference line RL1 is located on the outside (outer edge E20 side of the second basement 20) of the ideal line IL1 and extends linearly in the second direction Y. A second reference line RL2 is located on the inside (display area DA side) of the ideal line IL1 and extends linearly in the second direction Y. A width Wa1 in the first direction X from the ideal line IL1 to the first reference line RL1 and a width Wa2 in the first direction X from the ideal line IL1 to the second reference line RL2 are the same as each other. An area from the first reference line RL1 to the second reference line RL2 is a margin area for the protection layer PF and is an area in which the first outer edge E1 can be located.

Even if the first outer edge E1 (borderline Ba) is deviated from the ideal line IL1 toward the second reference line RL2 side, the first hole VA (opening VAo) can cross the borderline Ba. However, if the first outer edge E1 (borderline Ba) is deviated from the ideal line IL1 toward the first reference line RL1 side, the first hole VA (opening VAo) may not cross the borderline Ba in some cases.

For the above-described reason, in the case of using printing for formation of the protection layer PF, the protection layer PF may be formed by performing so-called laser trimming subsequent to the printing. In laser trimming, a laser beam is emitted to a portion of the protection layer PF which belongs between the ideal line IL1 and the first reference line RL1 by laser scanning. As a result, a portion of the protection layer PF which runs off toward the first reference line RL1 can be removed. For example, the protection layer PF can be formed such that the first outer edge E1 is located on the ideal line IL1. For the above-described reason, the first outer edge E1 of the protection layer PF may be formed by both printing and laser trimming. Accordingly, the first hole VA (opening VAo) can stably cross the borderline Ba.

Unlike the present embodiment, the borderline Ba may not extend linearly in the second direction Y. As long as the first hole VA (opening VAo) crosses the borderline Ba, the borderline Ba may extend so as to meander in the second direction Y.

In the manufacturing process of the display panel PNL, for example, the second basement 20 having the above-described outer edge E20 and the like can be formed by cutting and splitting a collective entity including a plurality of display panels into individual display panels. In the present embodiment, the outer edge E20 extends on an ideal line IL2 which extends linearly in the second direction Y.

The outer edge E20 may extend so as to meander in the second direction Y. Here, a width Wb is a distance in the first direction X from the ideal line IL2 to the first reference line RL1. An area between the ideal line IL2 and the first reference line RL1 is a margin area in consideration of some degree of meandering of the outer edge E20 caused by the above-described cutting process and is an area in which the outer edge E20 can be located.

The shortest distance from the terminal portion RT (second conductive layer L2) to the outer edge E20 is less than the distance from the ideal line IL2 to the ideal line IL1. As compared to a case where the above-described shortest distance is greater than the distance from the ideal line IL2 to the ideal line ILL it is possible to contribute to downsizing of the display panel PNL such as narrowing of the frame.

The display device DSP of the present embodiment is constituted as described above.

Next, the method of manufacturing the display device DSP of the present embodiment will be described. Here, the manufacturing method from formation of the protection layer PF to formation of the filling material FI will be described.

Figure 5:
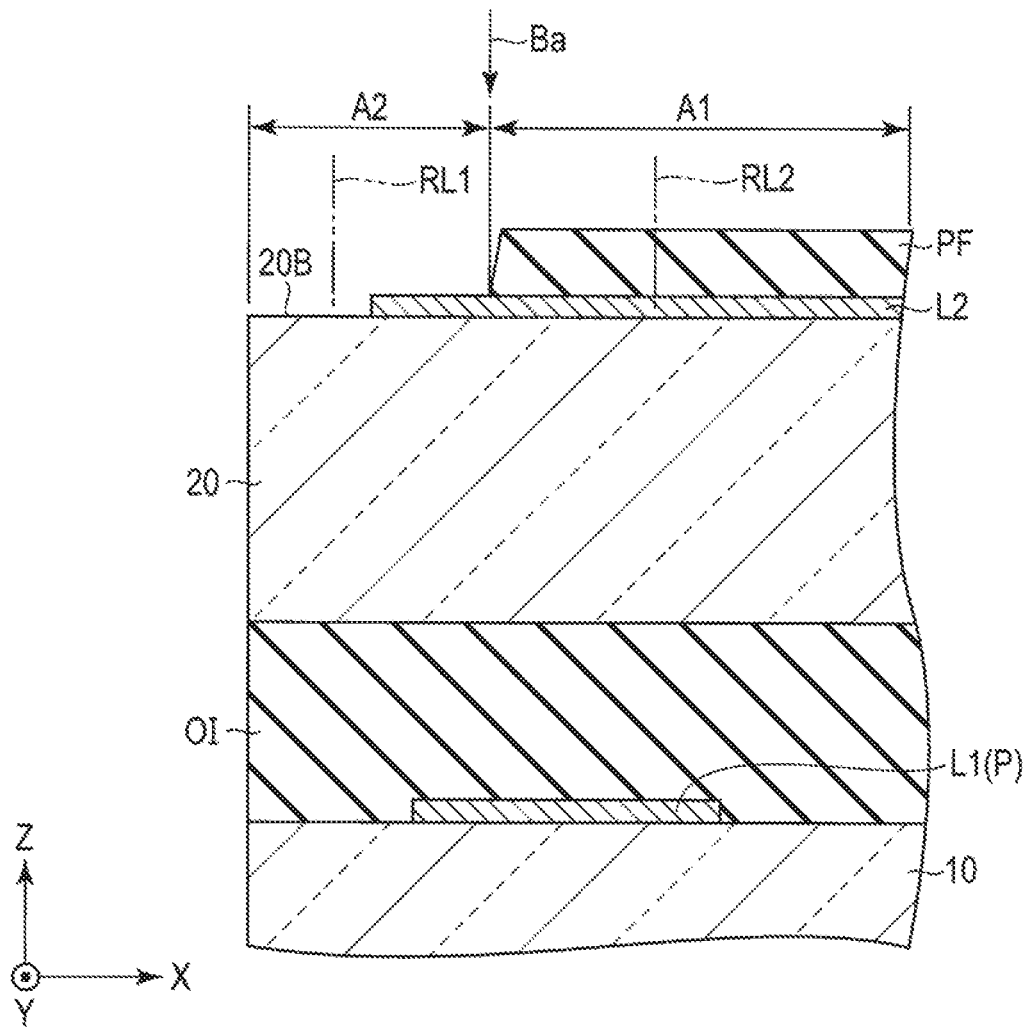
FIG. 5 is a sectional view showing a method of manufacturing the display device according to the first embodiment, and shows a state where the protection layer is formed on the display panel.

As shown in FIG. 5, firstly, the protection layer PF is formed by photolithography, printing or a combination of printing and laser trimming. At this moment, the protection layer PF includes the first outer edge E1 and does not include the second outer edge E2. Subsequently, a laser beam is emitted toward the second basement 20 from above the protection layer PF.

Figure 6:
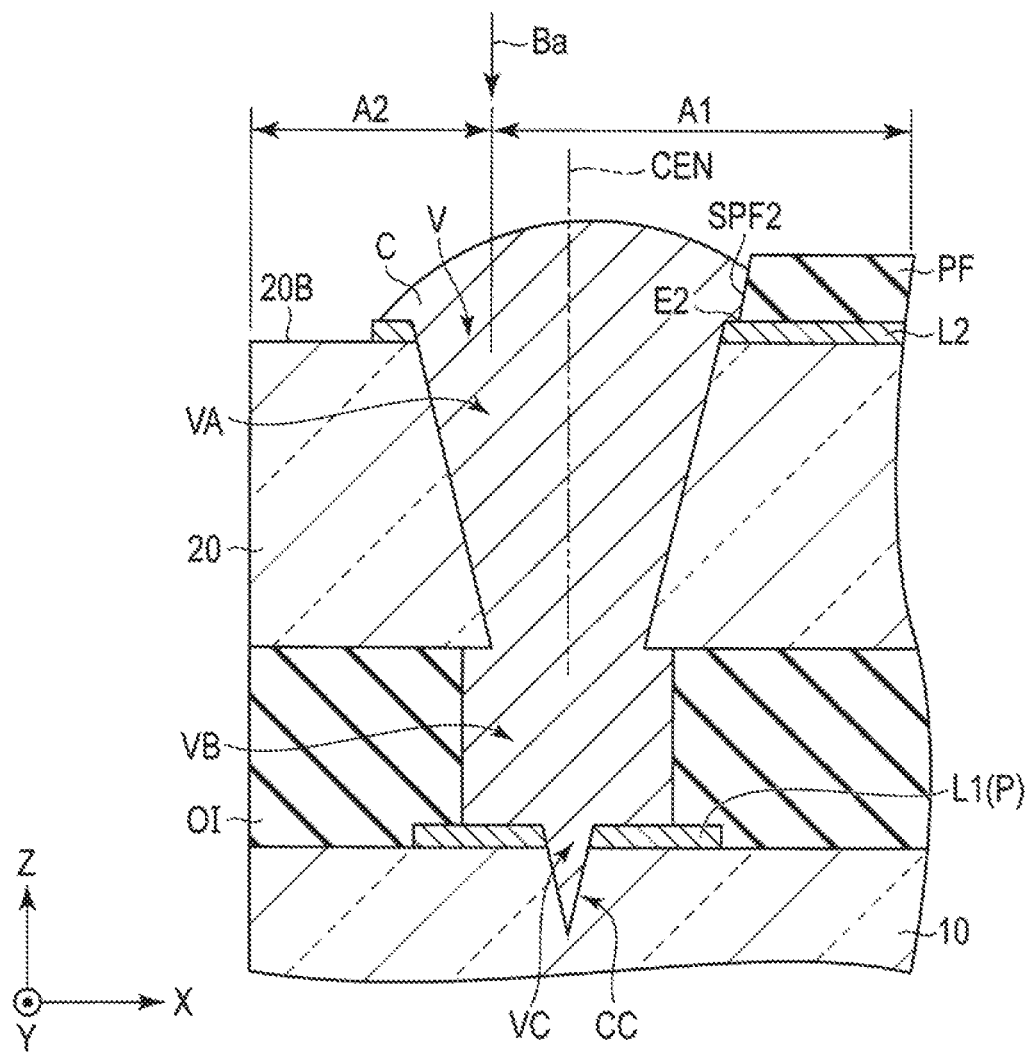
FIG. 6 is a subsequent sectional view of FIG. 5 showing the method of manufacturing the display device according to the first embodiment, and shows a state where a contact hole is formed by emission of a laser beam to the second basement and the contact hole is filled with the connecting material.

As shown in FIG. 6, the contact hole V which penetrates the second basement 20, the organic insulating layer OI and the first conductive layer L1 and dents the first basement 10 can be formed. Further, the protection layer PF and the terminal portion RT (second conductive layer L2) can be partially removed. The second outer edge E2 is formed in the protection layer PF.

It is also possible to employ a process of forming the contact hole V by emitting the above-described laser beam and subsequently forming the first outer edge E1 by performing laser trimming of the protection layer PF.

Further, if thermal energy is given to the display panel PNL by laser beam emission, an organic insulating material used for the organic insulating layer OI sublimes more easily than metal used for the first conductive layer L1 and glass used for the second basement 20. Therefore, the second hole VB is enlarged.

For example, a carbon dioxide laser or the like can be employed as the laser, but any laser which can form a hole in the second basement 20 and the organic insulating layer OI can be employed as the laser, and an excimer laser or the like can also be employed as the laser.

Subsequently, the connecting material C which electrically connects the first conductive layer L1 and the second conductive layer L2 is formed. More specifically, firstly, the connecting material C is injected into the contact hole V. The connecting material C may be injected under atmospheric pressure from start to finish. Alternatively, the connecting material C is injected in a vacuum atmosphere (under an environment where pressure is lower than atmospheric pressure), and the pressure of an atmosphere on the outside of the connecting material C may be returned to atmospheric pressure. Accordingly, the connecting material C flows into the bottom of the contact hole V, and the connecting material C contacts the first conductive layer L1.

In either injection method of the connecting material C, a side surface SPF2 along the second outer edge E2 among the side surfaces of the protection layer PF can hold back the connecting material C. Further, as the connecting material C is held back by the side surface of the protection layer PF, this can cause a certain surface tension on the connecting material C. As compared to a case where the connecting material C is not held back by the protection layer PF, the spread of the connection material C can be prevented, and the connecting material C can be thickly formed.

Subsequently, as shown in FIG. 3, the solvent contained in the connecting material C is removed, and the volume of the connecting material C is reduced and the connecting material C which covers the inner surface of the contact hole V in the form of a film is formed. The connecting material C formed as described above is in contact with the second basement 20 in the hole VA, is in contact with the organic insulating layer OI and the upper surface LT1 in the hole VB, is in contact with the inner surface LS1 in the hole VC, and is in contact with the first basement 10 in the concavity CC. The above-described formation method of the connecting material C is merely an example and is not intended to limit the formation method of the connecting material C.

As described above, in the present embodiment, the connecting material C can be thickly formed by using the holdback effect of the side surface of the protection layer and the surface tension generation effect associated with the holdback effect in the process of injecting the connecting material C. Therefore, a sufficient amount of connecting material C can be supplied to the contact hole V. As a result, the connecting material C can be formed continuously between the first conductive layer L1 and the second conductive layer L2, and reliability of the injection process of the connecting material is enhanced. Further, the connecting material C having a low electrical resistance can be obtained.

Subsequently, the solvent of the connecting material C evaporates, and the connecting material C is reduced in thickness and is attached to the contact hole V and the circumference of the opening VAo. Since a sufficient amount of connecting material C can be supplied as described above, the connecting material C having a sufficient thickness can be formed to the contact hole V.

After that, the filling material FI is formed, and such an inter-substrate conducting structure as that of FIG. 3 is thereby formed. In the example shown in FIG. 3, the filling material FI fills a remaining portion of the inside of the contact hole V other than the connecting material C, and covers the connecting material C and a portion of the second conductive layer L2 which is not covered with the protection layer PF and the connecting material C. As a result, a surface of the protection layer PF and a surface of the filling material FI which are opposed to the second polarizer PL2, respectively, are planarized, and a level difference of a portion which overlaps the contact hole V can be moderated.

According to the display device DSP of the first embodiment constituted as described above, the detection electrode Rx provided in the second substrate USB2 is connected to the pad P provided in the first substrate SUB1 by the connecting material C provided in the contact hole V. Therefore, it is no longer necessary to mount a circuit board which connects the detection electrode Rx and the detection circuit RC on the second substrate SUB2.

The first hole VA (opening VAo) crosses the borderline Ba. Therefore, it is possible to contribute to downsizing of the display panel PNL such as narrowing of the frame.

The protection layer PF comprises the side surface SPF2 (second outer edge E2). The protection layer PF can hold back the connecting material C which tends to spread in a direction along the second surface 20B when the connecting material C is formed, and therefore the connecting material C can be thickly formed. In other words, the connecting material C can be held in the vicinity of the contact hole V. As a result, it is possible to make the first conductive layer L1 and the second conductive layer L2 excellently continuous with each other by the connecting material C.

According to the structure, the connecting material C is less likely to spread to the display area DA side. Since the connecting material C can be made less visually recognizable to the user, the display device DSP which achieves excellent display quality can be obtained. Alternatively, the distance from an inner periphery IP of the light-shielding layer SH to the contact hole V in a plan view can be reduced, and therefore the display device DSP which can achieve narrowing of the frame can be obtained.

From the above, the display device DSP which can achieve narrowing of the frame can be obtained. Further, the display device DSP comprising the highly-reliable inter-substrate connector can be obtained.

Comparative Example 1

Figure 7B:
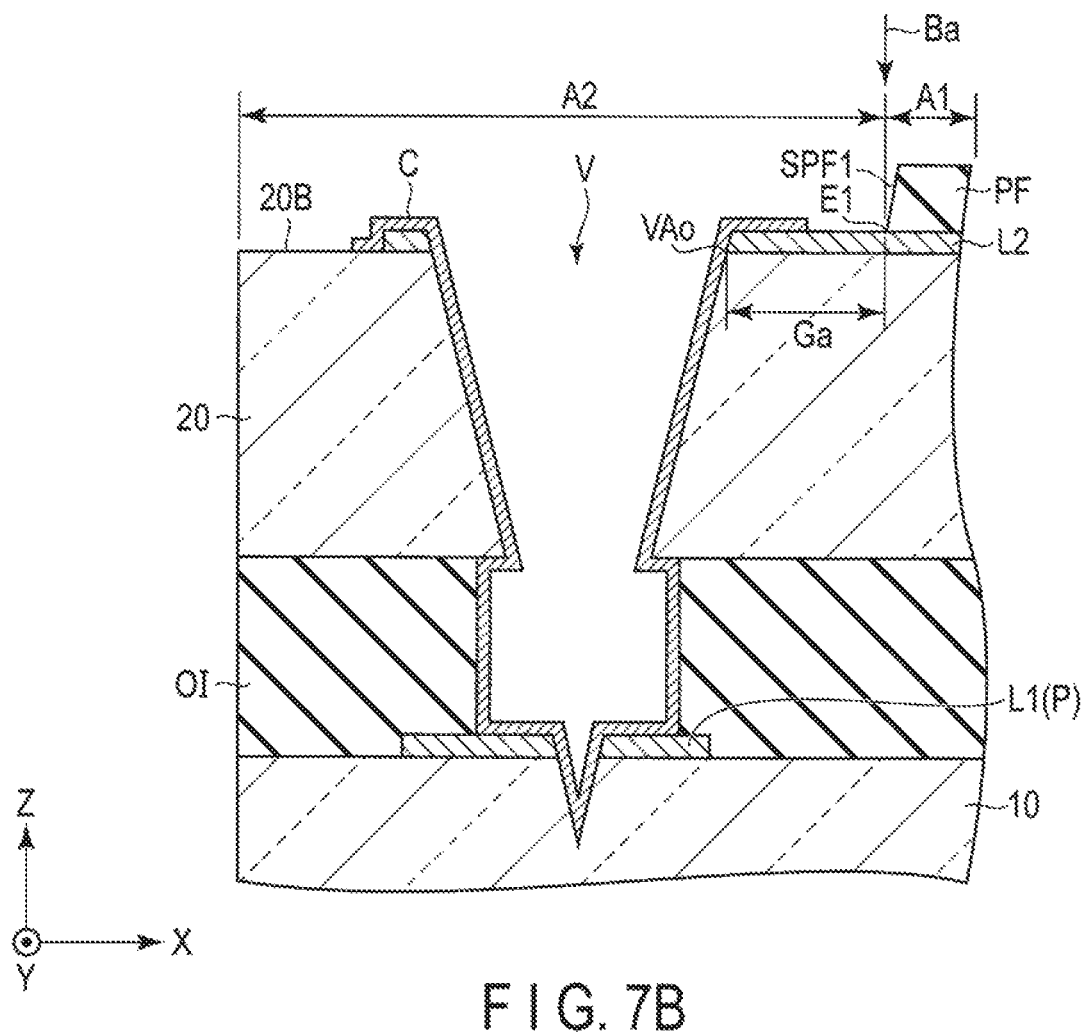
FIG. 7B is a sectional view of the display device taken along line VIIB-VIIB of FIG. 7A.

Next, a comparative example 1 will be described. The comparative example 1 differs from the above-described first embodiment in the position of the outer edge of the protection layer PF. In FIGS. 7A and 7B, only main portions necessary for explanation are illustrated. For example, the filling material FI is not illustrated.

As shown in FIG. 7A, the first hole VA (opening VAo) does not cross the borderline Ba. As a result, the first hole VA (opening VAo) is located at the second area A2 and is not located in the first area A1.

Further, the outer edge of the protection layer PF is formed substantially only of the first outer edge E1 and does not include the above-described second outer edge E2. The first outer edge E1 is separated from the opening VAo in the first direction X. Therefore, even if the first hole VA is formed by laser beam emission, the position and shape of the first outer edge E1 are maintained.

As compared to the above-described first embodiment, the connecting material C spreads unevenly in a plan view. The reason is because the metal material cannot be held back by the protection layer PF or the protection layer PF cannot cause a desired surface tension on the metal material when the connecting material C is formed.

Here, the first reference line RL1 passes through the rim of the opening VAo on the display area DA side and extends linearly in the second direction Y. A third reference line RL3 passes through the rim of the opening VAo on the outer edge E20 side and extends linearly in the second direction Y. A fourth reference line RL4 is located between the third reference line RL3 and the ideal line IL2 and extends linearly in the second direction Y. A width We is a distance in the first direction X from the third reference line RL3 to the fourth reference line RL4. A width Wb is a distance in the first direction X from the ideal line IL2 to the fourth reference line RL4.

An area between the third reference line RL3 and the fourth reference line RL4 is a margin area for the connecting material C and is an area in which the connecting material C can exist. An area between the ideal line IL2 and the fourth reference line RL4 is a margin area for the outer edge E20 and is an area in which the outer edge E20 can be located.

The borderline Ba is located between the display area DA and the opening VAo. Therefore, narrowing of the frame will not be prevented by the protection layer PF. Incidentally, the second surface 20B needs to be exposed in the cutting process for obtaining the outer edge E20. Therefore, it is necessary to prevent such a state where the protection layer PF and the metal layer enter the area between the fourth reference line RL4 and the ideal line IL2. However, in the comparative example 1, since the connecting material C tends to spread, the width Wc needs to be sufficiently secured. Therefore, in the comparative example 1, as the margin area has the width Wc, narrowing of the frame may be prevented, accordingly.

As shown in FIG. 7B, the protection layer PF has the side surface SPF1 along the first outer edge E1. The connecting material C is not in contact with the side surface SPF1. As compared to the above-described first embodiment, the distance Ga from the rim of the opening VAo to the side surface SPF1 is long. Therefore, when the connecting material C is formed such that the connecting material is thickly formed, the connecting material C spreads too widely, and the widespread connecting material C may enter the cutting area. On the other hand, when the connecting material C is formed such that the metal material is thinly formed, the connecting material C will be prevented from spreading. In this case, however, the connecting material C may be formed more thinly than expected, and the connecting material C may be disconnected between the first conductive layer L1 and the second conductive layer L2. Further, the connecting material C having a low electrical resistance cannot be obtained. As a result, the connection reliability of the connecting material C will be reduced.

For the above-described reason, the display device DSP which can achieve narrowing of the frame cannot be obtained. Further, the display device DSP comprising the highly-reliable inter-substrate connector cannot be obtained.

Comparative Example 2

Figure 8A:
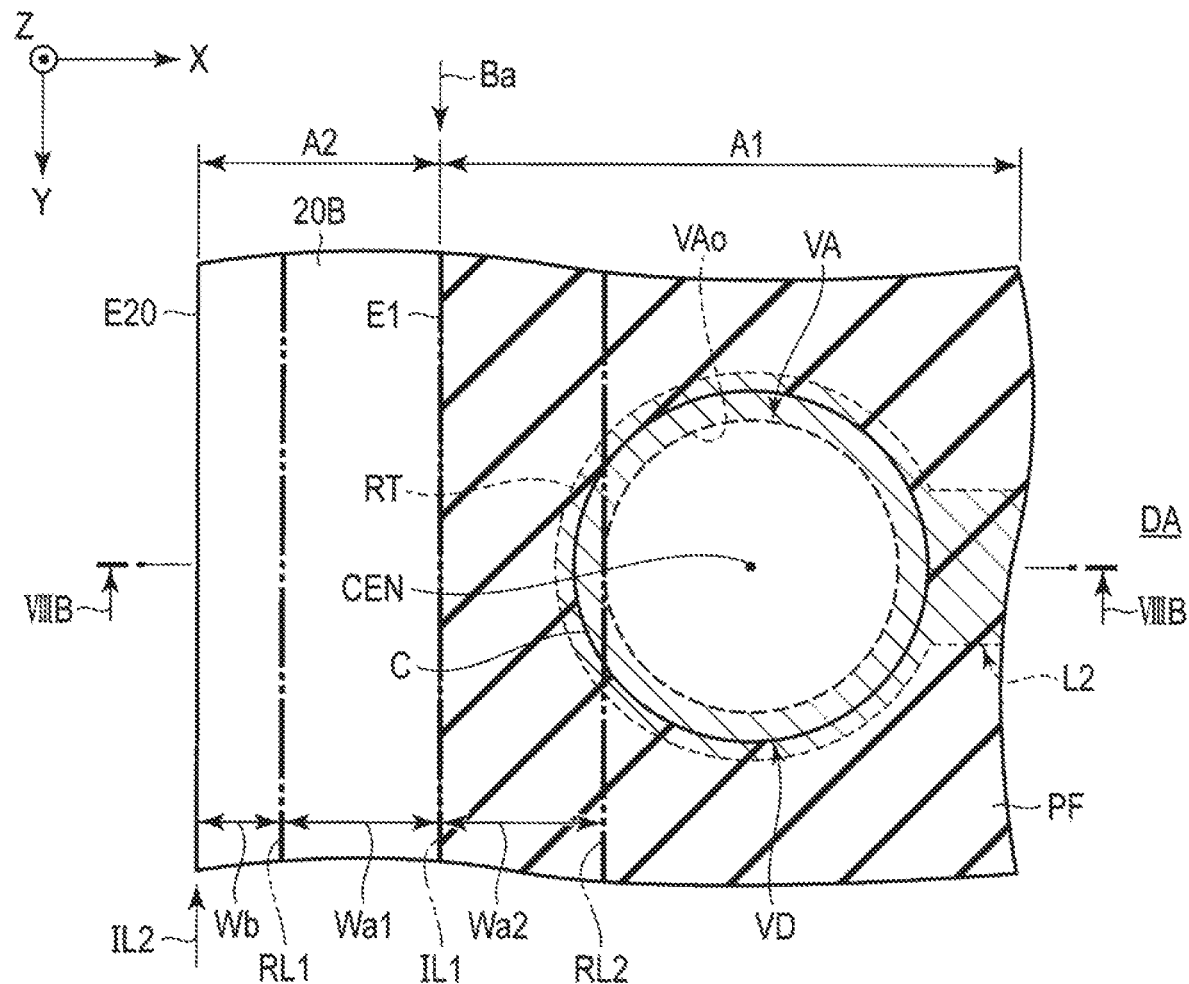
FIG. 8A is a plan view showing a non-display area of a display device according to a comparative example 2, and shows a second basement, a second conductive layer, a protection layer and a connecting material.
Figure 8B:
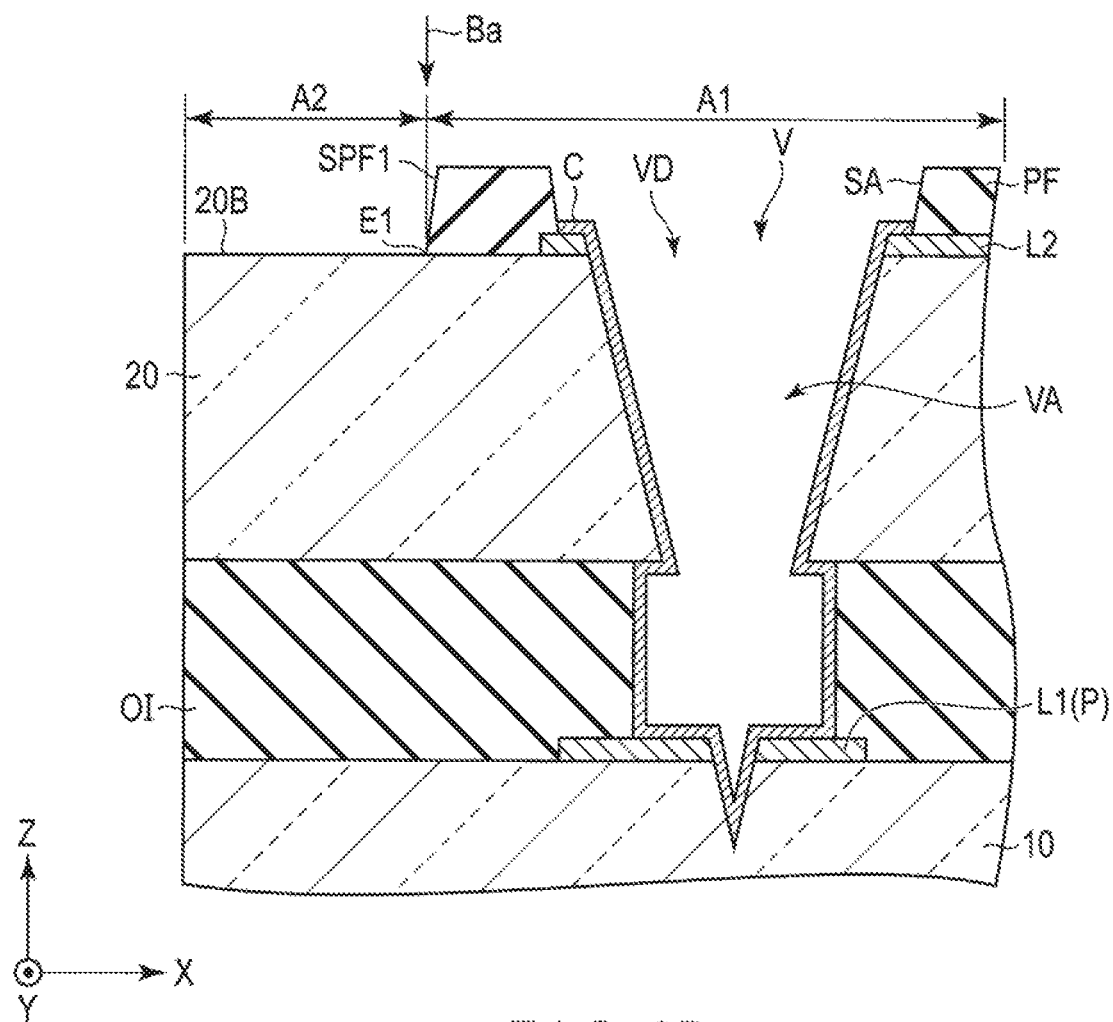
FIG. 8B is a sectional view of the display device taken along line VIIIB-VIIIB of FIG. 8A.

Next, a comparative example 2 will be described. The comparative example 2 differs from the above-described first embodiment and the above-described comparative example 1 in the position of the outer edge of the protection layer PF. In FIGS. 8A and 8B, only main portions necessary for explanation are illustrated. For example, the filling material FI is not illustrated.

As shown in FIG. 8A, the first hole VA (opening VAo) does not cross the borderline Ba. The first hole VA (opening VAo) is located at the first area A1 and is not located at the second area A2.

The outer edge of the protection layer PF includes the first outer edge E1 and does not include the above-described second outer edge E2. Therefore, a laser beam for forming the first hole VA is emitted to the protection layer PF, and a fourth hole VD is formed in the protection layer PF. The fourth hole VD is opposed to the first hole VA in the third direction Z. Further, in the case of the present comparative example 2, when the laser beam is emitted as described above, a material used for the protection layer PF sublimes more easily than materials used for the second basement 20 and the second conductive layer L2. Therefore, as described above, the fourth hole VD is larger than the first hole VA. The position and shape of the first outer edge E1 are maintained.

Here, the second reference line RL2 passes through the rim of the opening VAo on the outer edge E20 side and extends linearly in the second direction Y. The borderline Ba is located on the outer edge E20 side of the opening VAo. Therefore, downsizing of the display panel PNL such as narrowing of the frame cannot be achieved in the present comparative example 2 as compared to a case where the first hole VA (opening VAo) crosses the borderline Ba.

As shown in FIG. 8B, the protection layer PF includes an inner surface SA in the fourth hole VD. The connecting material C is in contact with the inner surface SA. As compared to the above-described first embodiment, the spreading of the connecting material C of the present comparative example 2 is further prevented. The reason is because the metal material can be held back by the inner surface SA or the inner surface SA can cause a surface tension on the metal material when the connecting material C is formed. When the connecting material C is formed, the metal material can be thickly formed. The connecting material C can excellently connect the first conductive layer L1 and the second conductive layer L2.

As described above, the display device DSP comprising the highly-reliable inter-substrate connector can be obtained in the comparative example 2. However, in the comparative example 2, the display device DSP which can achieve narrowing of the frame cannot be obtained.

As compared to these comparative examples, the protection layer PF includes the first outer edge E1 and the second outer edge E2 in the above-described first embodiment. It is possible to obtain a holdback effect, in particular, on the display area DA side by the protection layer PF. Further, the margin area for the protection layer PF can be narrowly estimated in the non-display area NDA, and this eventually contributes to narrowing of the frame.

Further, since the side surface SPF2 (second outer edge E2) is provided at a position surrounding the opening VAo, it is possible to cause a surface tension on the connecting material C excellently in the injection process of the connecting material C. The surface tension effectively acts around the whole circumference of the outer edge of the injected connecting material C in a plan view. Therefore, even in an area where the side surface SPF2 does not exist (an area where the protection layer PF does not exist), the leakage of the connecting material C can be prevented by the effect of the surface tension. Alternatively, even if the connecting material C leaks, the leakage of the connecting material C can be minimized.

As described above, the connecting material C is held back by the protection layer PF on the display area DA side, and the connecting material C is prevented from spreading by generation of the surface tensile of the side surface SPF2 on the outer edge E20 side. It is possible to prevent spreading of the connecting material C without forming a wall surface of the protection layer PF or the like on the outer edge E20 side. Therefore, it is not necessary to form a structure for holding back the connecting material C on the outer edge E20 side. Further, it is not necessary to consider an area for forming the structure or leave a margin for cutting from the outer edge of the structure. Therefore, it is possible to contribute to narrowing of the frame.

Next, modified examples of the above-described first embodiment will be described.

Modified Example 1

Figure 9:
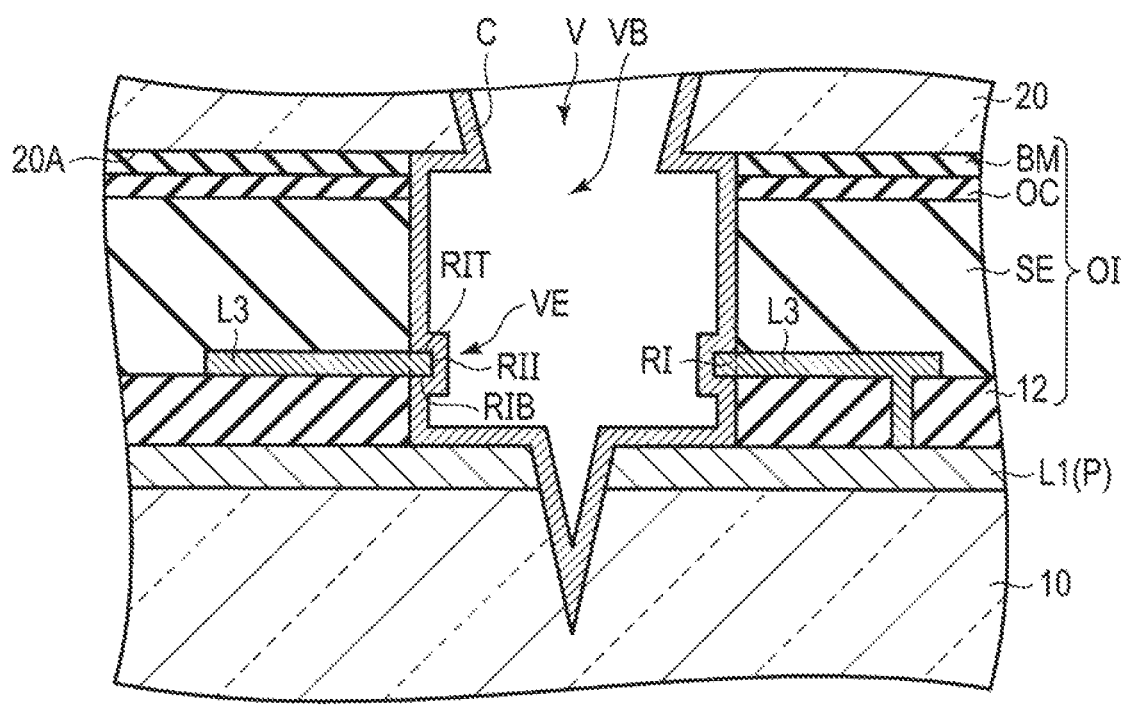
FIG. 9 is a sectional view showing a configuration example of a display panel of a display device according to a modified example 1 of the first embodiment.

For example, as shown in FIG. 9, the connecting material C may be in contact not only with the first conductive layer L1 but also with a third conductive layer L3 as electrodes on the first substrate SUB1 side. The first substrate SUB1 further comprises the third conductive layer L3. The third conductive layer L3 is formed between the second insulating film 12 and the sealing member SE. For example, the third conductive layer L3 is formed of the same material as and formed concurrently with the above-described metal layer M. The third conductive layer L3 is electrically connected to the first conductive layer L1. In the example shown in FIG. 9, the third conductive layer L3 is in contact with the first conductive layer L1 through a contact hole formed in the second insulating layer 12.

The contact hole V further comprises a fifth hole VE which penetrates the third conductive layer L3. The area of the second hole VB is larger than the area of the fifth hole VE in a plan view. The third conductive layer L3 has a ring-shaped portion RI which is not covered with the second insulating layer 12 and the sealing member SE. The connecting material C is in contact with the above-described portion RI of the third conductive layer L3. For example, the connecting material C is in contact with an inner surface MI, an upper surface RIT and a lower surface RIB of the above-described portion RI.

Also in the present modified example, when thermal energy is given to the display panel PNL by laser beam emission, because of a difference in melting point, an organic insulating material used for the second insulating layer 12 and an organic insulating material used for the sealing member SE sublimate more easily than metal used for the third conductive layer L3. Therefore, the above-described portion RI is a portion which remains without being melted and an area which contacts the connecting material C.

As described above, in the example shown in FIG. 9, the connecting material C is in contact not only with the first conductive layer L1 but also with the third conductive layer L3. The contact area can be increased by the area of the connecting material C which is in contact with the third conductive layer L3.

Modified Example 2

Figure 10:
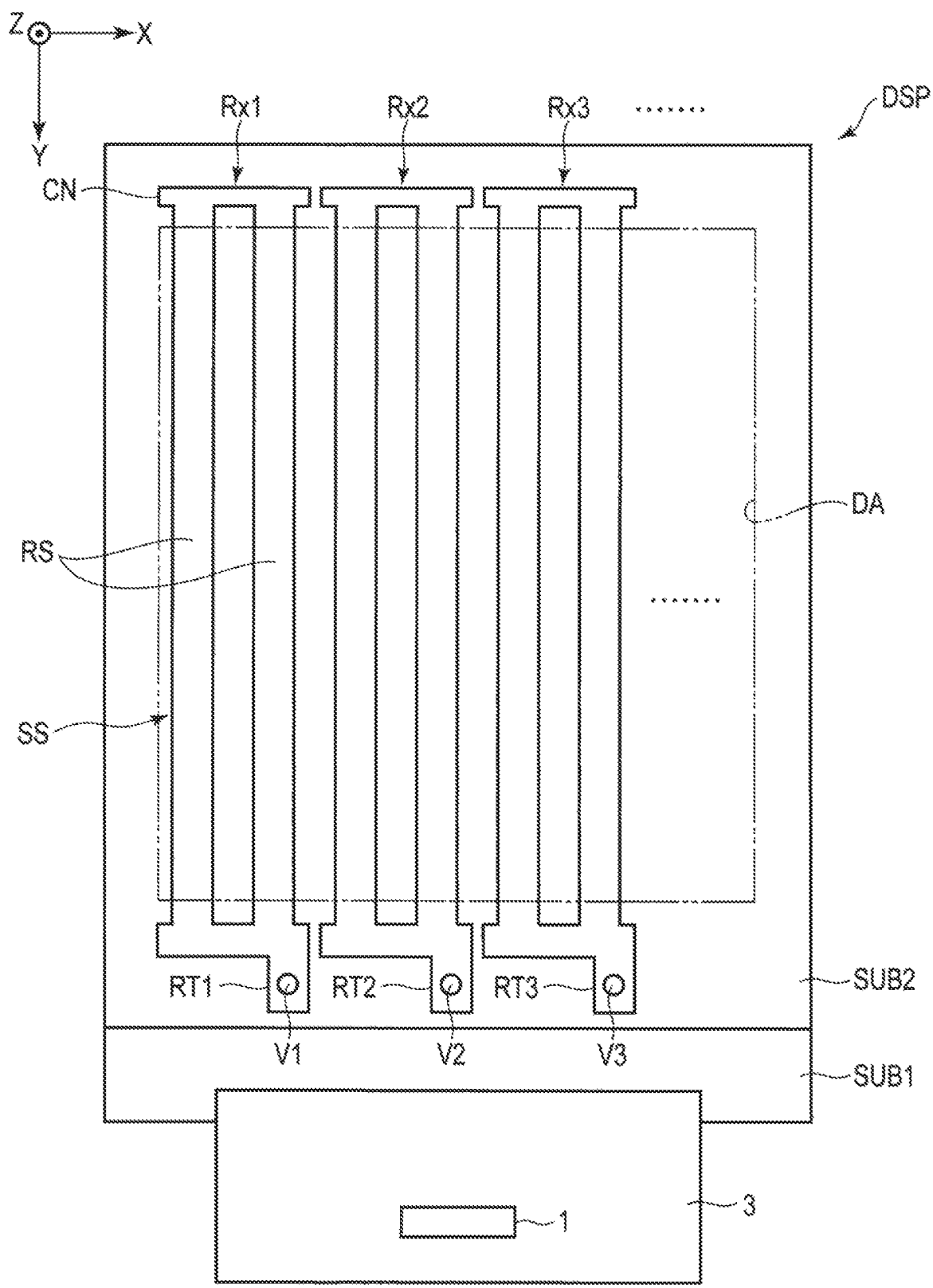
FIG. 10 is a plan view showing a configuration example of a display device according to a modified example 2 of the first embodiment.

As shown in FIG. 10, the detection electrodes Rx1, Rx2, Rx3 . . . may extend in the second direction Y, respectively, and may be arranged so as to be spaced apart from each other in the first direction X. The body portions RS extend in the second direction Y in the display area DA. Further, the terminal portions RT1, RT2, RT3 . . . are located between the display area DA and the wiring substrate 3 and are arranged so as to be spaced apart from each other in the first direction X. The contact holes V1, V2, V3 . . . are arranged so as to be spaced apart from each other in the first direction X.

Second Embodiment

Next, the second embodiment will be described. A sensor device will be described in the present embodiment. FIG. 11 is a sectional view showing a configuration example of a sensor device SEN according to the second embodiment.

As shown in FIG. 11, the sensor device SEN comprises the first substrate SUB1, the second substrate SUB2, the transparent insulating layer TI, the protection layer PF, the connecting material C, the circuit board 3, the IC chip 1 and the like. The first substrate SUB1, the second substrate SUB2, the transparent insulating layer TI, the protection layer PF and the connecting material C constitute a sensor panel SPNL. The sensor panel SPNL includes a sensing area AA and a non-sensing area NAA other than the sensing area AA.

The first substrate SUB1 comprises the first basement 10, the first conductive layers L1 and the sensor drive electrodes Tx.

The second substrate SUB2 comprises the second basement 20 including the first hole VA, and the detection electrodes Rx (second conductive layers L2) provided on the second surface 20B. The transparent insulating layer TI is located between the first substrate SUB1 and the second substrate SUB2. For example, the transparent insulating layer TI is formed of a transparent organic insulating material and bonds the first substrate SUB1 and the second substrate SUB2 together. For example, the contact hole V is formed in a manner similar to that of the above-described first embodiment except that the contact hole V does not penetrate the organic insulating layer OI but penetrates the transparent insulating layer TI. The sensing area AA corresponds to the above-described display area DA, and the non-sensing area NAA corresponds to the above-described non-display area NDA.

The sensor drive electrode Tx and the detection electrode Rx cross each other in the sensing area AA. The first area A1 is provided along the outer edge of the sensing area AA, and the second area A2 is provided along the outer edge of the first area A1. The non-sensing area NAA includes the first area A1 and the second area A2.

The protection layer PF is located in the sensing area AA and the first area A1 and is not located in the second area A2. The protection layer PF includes the second surface SPF2. The protection layer PF includes the above-described first outer edge (E1) and second outer edge (E2). The protection layer PF covers at least a portion which belongs to the sensing area AA of the second conductive layer L2.

The connecting material C electrically connects the first conductive layer L1 and the detection electrode Rx through the contact hole V. The connecting material C is in contact with the side surface SPF2 above the second surface 20B.

Also in the sensor device SEN of the second embodiment constituted as described above, the relationship between the outer edge of the protection layer PF and the first hole VA (opening VAo) is similar to that of the above-described first embodiment. Also in the second embodiment, advantages similar to those of the above-described first embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising a display panel including a display area and a non-display area, the non-display area including a first area provided along an outer edge of the display area and a second area provided along an outer edge of the first area, the display panel comprising:
a first substrate comprising a first basement and a first conductive layer;
a second substrate comprising
a second basement including a first surface separately opposed to the first conductive layer, a second surface opposed to the first surface and a contact hole penetrating from the second surface to the first surface and crossing a borderline between the first area and the second area; and
a second conductive layer provided on the second surface;
a protection layer provided over the display area and the first area of the second surface and covering at least a portion which belongs to the display area of the second conductive layer; and
a connecting material electrically connecting the first conductive layer to the second conductive layer through the contact hole,
wherein
an outer edge of the protection layer includes one first outer edge located on the borderline, another first outer edge located on the borderline opposed to the one first outer edge across the contact hole, and a second outer edge provided in the first area, connected to an end of the one first outer edge and an end of the other first outer edge and extending along the contact hole.

2. The display device of claim 1, wherein the connecting material is in contact with the second outer edge.

3. The display device of claim 2, wherein
the contact hole includes an opening at the second surface,
the second conductive layer is located around the opening,
the second outer edge is spaced apart from a rim of the opening, and
the connecting material is in contact with a portion of the second conductive layer which is located in an area between the rim of the opening and the second outer edge.

4. The display device of claim 3, wherein the connecting material is in contact with a portion of the second conductive layer which is located in the second area.

5. The display device of claim 3, wherein a distance from the rim of the opening to the second outer edge and a thickness of the protection layer are substantially equal as each other.

6. The display device of claim 1, wherein a center of the contact hole is at the first area.

7. The display device of claim 1, wherein
the contact hole includes an opening at the second surface, and
the second outer edge and a portion of a rim of the opening which is located in the first area are geometrically similar to each other in a plan view.

8. The display device of claim 1, wherein
the contact hole has a shape of a circle, and
the second outer edge has a shape of an arc.

9. The display device of claim 1, further comprising a detection circuit,
wherein
the second conductive layer comprises a detection electrode, and
the detection circuit is electrically connected to the first conductive layer and reads a sensor signal output from the detection electrode.

10. The display device of claim 9, wherein the first substrate comprises a sensor drive electrode crossing the detection electrode.

11. The display device of claim 1, further comprising a controller,
wherein
the first substrate further comprises a pixel electrode and a sensor drive electrode which are located between the first basement and the second substrate,
the second conductive layer comprises a detection electrode,
the controller supplies an image signal to the pixel electrode and supplies a common signal to the sensor drive electrode in a display period when an image is displayed, and
the controller supplies a sensor drive signal to the sensor drive electrode and reads a sensor signal output from the detection electrode in a sensing period when sensing is performed.

12. A sensor device comprising a sensor panel including a sensing area and a non-sensing area, the non-sensing area including a first area provided along an outer edge of the sensing area and a second area provided along an outer edge of the first area,
the sensor panel comprising:
a first substrate comprising a first basement and a first conductive layer;
a second substrate comprising
a second basement including a first surface separately opposed to the first conductive layer, a second surface opposed to the first surface and a contact hole penetrating from the second surface to the first surface and crossing a borderline between the first area and the second area; and
a second conductive layer provided on the second surface;
a protection layer provided over the sensing area and the first area of the second surface and covering at least a portion which belongs to the sensing area of the second conductive layer; and
a connecting material electrically connecting the first conductive layer to the second conductive layer through the contact hole,
wherein
an outer edge of the protection layer includes one first outer edge located on the borderline, another first outer edge located on the borderline opposed to the one first outer edge across the contact hole, and a second outer edge provided in the first area, connected to an end of the one first outer edge and an end of the other first outer edge and extending along the contact hole.

13. The sensor device of claim 12, wherein the connecting material is in contact with the second outer edge.

14. The sensor device of claim 13, wherein
the contact hole includes an opening at the second surface,
the second conductive layer is located around the opening,
the second outer edge is spaced apart from an rim of the opening, and
the connecting material is in contact with a portion of the second conductive layer which is located in an area between the rim of the opening and the second outer edge.

15. The sensor device of claim 14, wherein the connecting material is in contact with a portion of the second conductive layer which is located in the second area.

16. The sensor device of claim 12, wherein a center of the contact hole is at the first area.

17. The sensor device of claim 12, wherein
the contact hole includes an opening at the second surface, and
the second outer edge and a portion of a rim of the opening which is located in the first area are geometrically similar to each other in a plan view.

18. The sensor device of claim 12, further comprising a detection circuit,
wherein
the second conductive layer comprises a detection electrode, and
the detection circuit is electrically connected to the first conductive layer and reads a sensor signal output from the detection electrode.

19. The sensor device of claim 18, wherein the first substrate comprises a sensor drive electrode crossing the detection electrode.

20. The sensor device of claim 12, further comprising a controller,
wherein
the first substrate further comprises a sensor drive electrode located between the first basement and the second substrate,
the second conductive layer comprises a detection electrode, and
the controller supplies a sensor drive signal to the sensor drive electrode and reads a sensor signal output from the detection electrode in a sensing period when sensing is performed.

* * * * *